United States Patent
Jahnke et al.

(10) Patent No.: US 6,742,058 B2
(45) Date of Patent: May 25, 2004

(54) MEMORY CONTROLLER HAVING A MULTIPLEXER SELECTING EITHER SECOND SET OF INPUT SIGNALS OR CONVERTED SIGNALS FROM FIRST SET OF INPUT SIGNALS BY A BUS MODE INPUT

(75) Inventors: Steven R. Jahnke, Tokyo (JP); Hiromichi Hamakawa, Ibaraki (JP); Naoto Mabuchi, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 110 days.

(21) Appl. No.: 10/259,552

(22) Filed: Sep. 27, 2002

(65) Prior Publication Data

US 2004/0064599 A1 Apr. 1, 2004

(51) Int. Cl.⁷ .............................................. G06F 13/14
(52) U.S. Cl. .............................. 710/14; 710/51; 710/62; 710/65; 710/305
(58) Field of Search .................... 710/8, 14, 36, 710/51, 62, 65, 72, 305, 316; 712/29, 39, 43

(56) References Cited

U.S. PATENT DOCUMENTS

| | | | |
|---|---|---|---|
| 5,630,106 A | * | 5/1997 | Ishibashi .................... 345/533 |
| 6,199,153 B1 | * | 3/2001 | Razdan et al. .............. 711/212 |
| 2003/0174569 A1 | * | 9/2003 | Amidi .................... 365/230.03 |
| 2003/0185032 A1 | * | 10/2003 | Zagorianakos et al. ....... 365/63 |

* cited by examiner

Primary Examiner—Ilwoo Park
(74) Attorney, Agent, or Firm—Robert D. Marshall, Jr.; W. James Brady, III; Frederick J. Telecky, Jr.

(57) ABSTRACT

A configurable memory controller for an AMBA system is described. This configurable memory controller selects one of two possible modes of operation. The technique of configuring the memory controller provides fundamental memory control in the AMBA system while also allowing for a switching mechanism to select between the two modes, each of which entails its own set of special signal definitions. The configurable memory controller may be connected either on the AHB bus or directly connected to the ARM central processing unit core with a mechanism to switch between the two modes of operation.

8 Claims, 4 Drawing Sheets

MEMORY CONTROLLER HAVING A MULTIPLEXER SELECTING EITHER SECOND SET OF INPUT SIGNALS OR CONVERTED SIGNALS FROM FIRST SET OF INPUT SIGNALS BY A BUS MODE INPUT

TECHNICAL FIELD OF THE INVENTION

The technical field of this invention is memory controllers for small computer systems.

BACKGROUND OF THE INVENTION

As computer systems have grown more complex, it has become common to employ multiple processors and a wide variety of peripheral devices to transfer data within a chip and from the chip to external devices and visa versa. Such systems almost always have a multiple set of busses separating, for convenience and performance reasons, the communication between similar devices. Multiple bus systems must provide bus controllers to allow for coherent and collision-free communication between separate buses. Micro-controllers used for this purpose provide bus arbitration which determines, at a given time, which device has control of the bus in question.

A prominent standard bus system has emerged for high performance micro-controller designs. The Advanced Micro-controller Bus Architecture System AMBA™ has been defined by Advanced RISC Machines (ARM) Ltd. (Cambridge, U.K.) and is described in U.S. Pat. No. 5,740,461, dated Apr. 14, 1998. Computer systems of a CISC variety are complex instruction set computers and have total backward compatibility requirements over all versions. RISC (reduced instruction set computer) systems, by contrast, are designed to have simple instruction sets and maximized efficiency of operation. Complex operations are accomplished in RISC machines as well, but they are achieved by using combinations of simple instructions. The RISC machines of ARM Ltd. forming the AMBA architecture are of primary interest here.

FIG. 1 illustrates the standard AMBA™ architecture of prior art, with ARM central processing unit core and AHB Wrapper 101. AMBA has two main busses, an advanced high performance bus AHB 100 and an advanced peripheral bus APB 120 of more moderate performance. In this standard AMBA system the ARM central processing unit core is of moderate performance and does not use an instruction cache. As shown in FIG. 1 the AHB bus is the main memory bus and it couples to RAM 107, ROM 108, external memory interface 102 and direct memory access (DMA) controller 105. FIG. 1 also illustrates one additional high performance peripheral device 130 that will transfer large amounts of data. This peripheral 130 is placed on the high performance AHB bus. This decreases system performance, however, because the Arm central processing unit core cannot have access to memory when this high performance peripheral has control of the bus.

The standard AMBA architecture as illustrated in FIG. 1 employs an AHB-APB bus bridge 109 for controlling the passage of data involving the AHB bus devices, a series of peripheral devices 121 and 122, UART 115, timer 116 and keypad 117. The AHB bus arbiter 105 mediates control of AHB bus 100 between the three masters: ARM central processing unit core 101, direct memory access 105 and high performance peripheral device 130. The AHB-to-APB bus bridge 109 and external memory interface (EMI) 102, RAM 107 and ROM 108 are all slave devices on AHB bus 100.

In summary AMBA, as originally defined, had an ARM central processing unit core, a single high performance bus (AHB) with two or more masters and a more moderate performance peripheral bus APB linked to the AHB bus by the AHB-to-APB bridge. This basic system was created primarily to support cache-based systems or other forms of memory hierarchy.

SUMMARY OF THE INVENTION

This invention defines a configurable memory controller (CMC) operating in one of two possible modes for ARM or AHB systems. The configurable memory controller may be operated either in a basic ARM mode from the native ARM core control signals or in the standard AHB mode using AHB bus control signals generated in an AHB wrapper surrounding the ARM central processing unit core.

In the ARM mode, the system has an ARM core with its own ARM bus (no AHB bus or wrapper or arbitration). This system allows only one bus master, the ARM core itself. In this mode the configurable memory controller operates from raw ARM core control signals and is tied directly to ARM core bus. In the ARM mode, the configurable memory controller interfaces with peripherals using a built in peripheral interface to the APB bus.

In the AHB mode, the system has an AHB wrapper surrounding the ARM core as illustrated in FIG. 1. This wrapper is connected to an AHB bus allowing for two or more AHB bus masters with full arbitration. In this mode the configurable memory controller operates from AHB wrapper control signals and is tied directly to the AHB bus. In the AHB mode, the configurable memory controller interfaces with peripherals using the AHB-to-APB bridge.

This configurable memory controller provides the same fundamental memory control as in the AMBA system of FIG. 1. This configurable memory controller also provides a switching mechanism to select between the AHB mode and the ARM mode. Each mode has its own set of special signal definitions.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
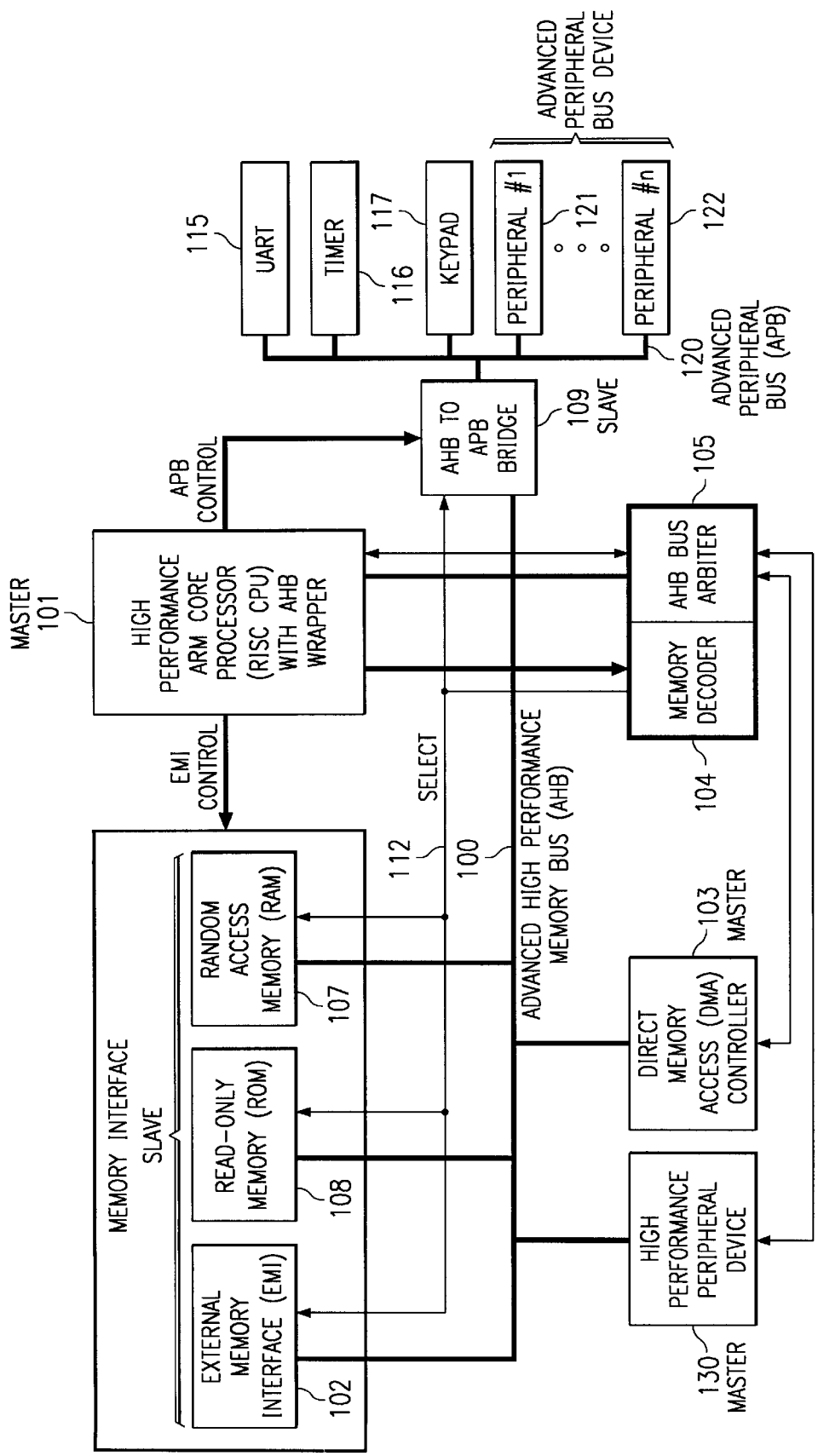
FIG. 1 illustrates the block diagram of a standard advanced micro-controller bus architecture AMBA having a conventional AHB bus system (Prior Art)

Most AMBA systems have simple memory hierarchy and utilize a single AHB bus with two bus masters. In these systems the usual practice is to connect the ARM processor to an AHB bus through an AHB wrapper. With the AHB bus as its primary memory bus, the system memory control signals are generated in the AHB wrapper. With this approach performance is on the order of a 25% reduction compared to the simpler case where the ARM core, the only bus master, is connected directly to the ARM bus and the ARM core directly produces ARM core memory control signals. Thus the configurable memory controller has two operating modes for corresponding processor systems. The first system is an ARM system using memory controller signals created in the ARM core itself. The second system is an AHB system using memory controller signals generated in the AHB wrapper in which the ARM core is embedded.

This invention describes a configurable memory controller (CMC) that can switch between the ARM core memory control signals and the AHB wrapper memory control signals. This configurable memory controller is applicable to both types of systems. By this means, a single memory controller design can be used in any AMBA system with AHB bus or simpler systems using ARM central processing unit core system with ARM bus and no AHB bus. If the central processing unit core used is a very high performance ARM central processing unit, the configurable memory controller uses the AHB wrapper control signals. If the core used is a more moderate performance level ARM central processing unit with a single bus master and no AHB bus, the configurable memory controller uses the raw ARM core control signals. Thus the single configurable memory controller of this invention can be used for any system employing an ARM core eliminating the need for a variety of different memory controller designs.

In the ARM mode the configurable memory controller performs program and data memory access using the ARM core control signals. In this ARM system only the ARM core is used. There is no direct memory access and no other system masters involved. For peripheral accesses in the ARM mode the APB interface that is part of the configurable memory controller of this invention can be used and no APB bus bridge components are needed.

In the AHB system two or more bus masters are used. These bus masters may include example the ARM core and a direct memory access controller. The AHB bus with an AHB-APB bridge is used. In this AHB mode, an AHB wrapper surrounds the ARM core. Program memory, FLASH memory, read only memory (ROM), external static random access memory (SRAM) are accessed through this configurable memory controller using AHB wrapper generated memory control signals. Data memory is placed on the AHB bus along with a direct memory access controller. Peripherals are accessed through the AHB-APB bus bridge.

The fundamental configurable aspect of the memory controller (CMC) of this invention permits switching between ARM core and AHB wrapper signals is facilitated. There are significant detailed functional operations that are altered when this switching from AHB wrapper memory control signals to ARM core memory control signals takes place. AHB operation is pipelined while ARM operation is not, so the configurable memory controller must make such an adjustment. The AHB pipeline causes the performance reduction in AHB systems that do not use an instruction cache. Since most low performance ARM devices do not use an instruction cache, this is an important factor. Having the configurable memory controller able to switch between the two sets of signals without any impact on the ARM or AHB definitions is the focus of the invention. Some of the detailed implementation issues involve (a) how to accomplish conversion to and from the pipeline operation and (b) conversion of signals to the unique external memory controller formats.

Since the configurable memory controller of this invention can be used in a system with only the central processing unit as a bus master, an APB interface section is also added to the configurable memory controller hardware so that an entire system may be implemented without some of the normally employed AHB components, such as the arbiter and the AHB decoder. Programmable features of the configurable memory controller are outlined below.

Figure 2:
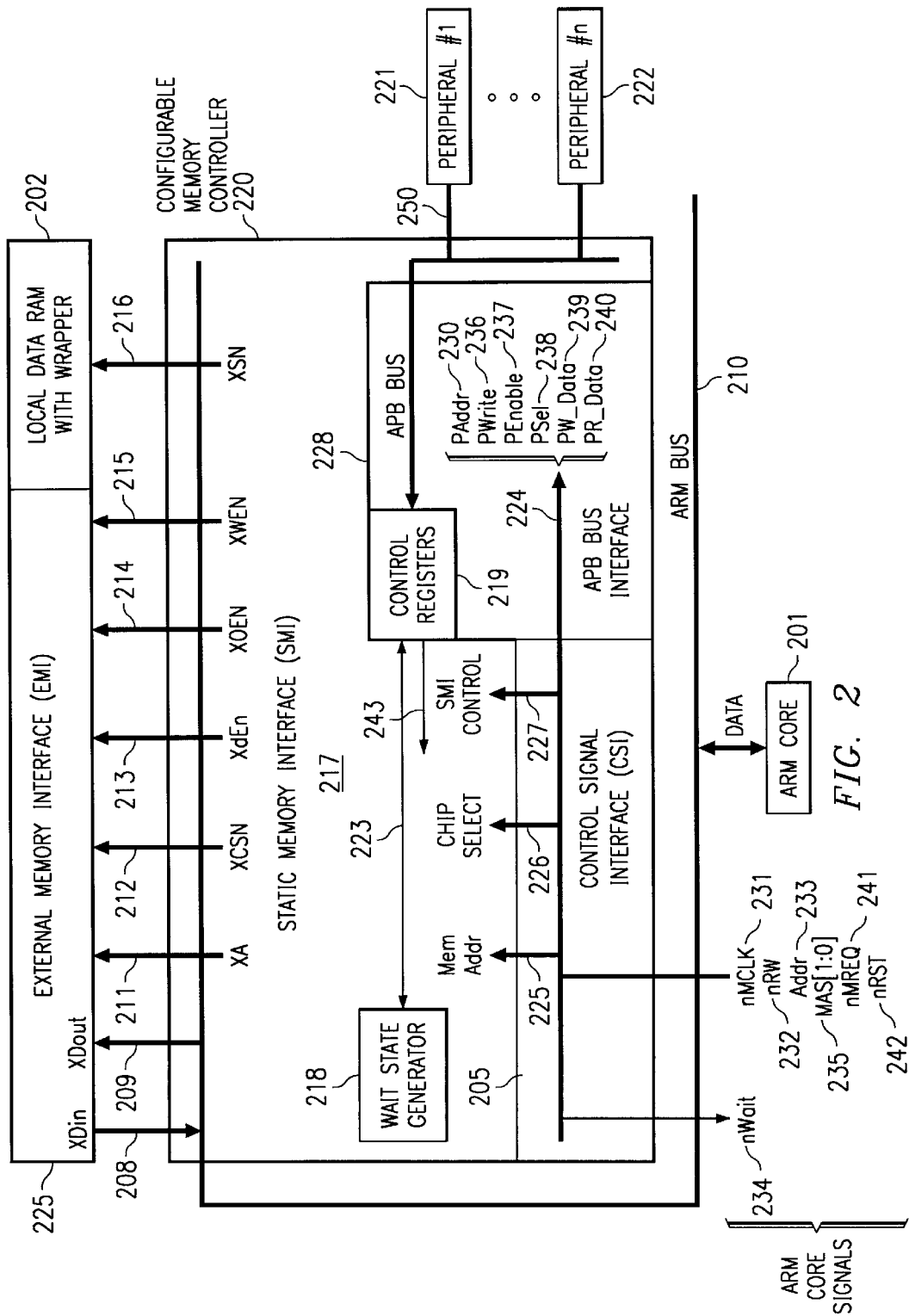
FIG. 2 illustrates the block diagram of an ARM system with only one bus master device, the central processing unit itself, and a configurable memory controller of this invention connected directly to the ARM bus and operating from raw ARM core generated control signals.

FIG. 2 illustrates the configurable memory controller used in an ARM system having an ARM bus 210 and only one bus master device, the ARM central processing unit core 201. The configurable memory controller (CMC) 220 uses the raw ARM core control signals 231 through 235, 241 and 242. Memory request signal (nMREQ) 241 initiates a memory request involving a location given by the ARM address bus (Addr) 233. The memory request is passed via the control signal interface 205 to the static memory interface (SMI) 217 through memory address bus 225, chip select 226 and SMI control 227. If the memory request is a write or read between the central processing unit and any block of memory including both external memory and local RAM 202 then static memory interface 217 processes the request. In this mode static memory interface 217 operates on the external memory interface 225 using only ARM core signals. This mode of operation allows the central processing unit to perform access to local RAM 202 on the ARM bus 210 simultaneously with other operations and no processor cycles are lost. Transactions passing data from either external ROM, external RAM or external FLASH memory, to the local memory 202 also require static memory interface 217 to operate from ARM core signals. Transactions involving writes to or reads from peripheral devices 221 or 222 require no arbitration and are carried out by the signals peripheral address (PAddr) 230, peripheral write (PWrite) 236, peripheral enable PEnable (237), peripheral select (PSel) 238 with data transferred through the paths peripheral write data (PW_Data) 239 and peripheral read data (PR_Data) 240.

The advanced peripheral bus (APB) 250 is linked to the configurable memory controller within the APB bus interface block 228. Static memory interface 217 controls the external memory interface 225 through signal paths external chip select (XCSN) 212, external tri-state enable (XdEn) 213, external output enable (XOEN) 214 and external output enable (XOEN) 215. Static memory interface 217 chip select signal (XSN) 216 drives local data memory 202. Data in (XDin) 208 passes from external memory interface 225 to static memory interface 217. Data out (XDout) 209 passes from static memory interface 217 to external memory interface 225. Addressing for external memory interface 225 passes through external address bus (XA) 211.

Figure 3:
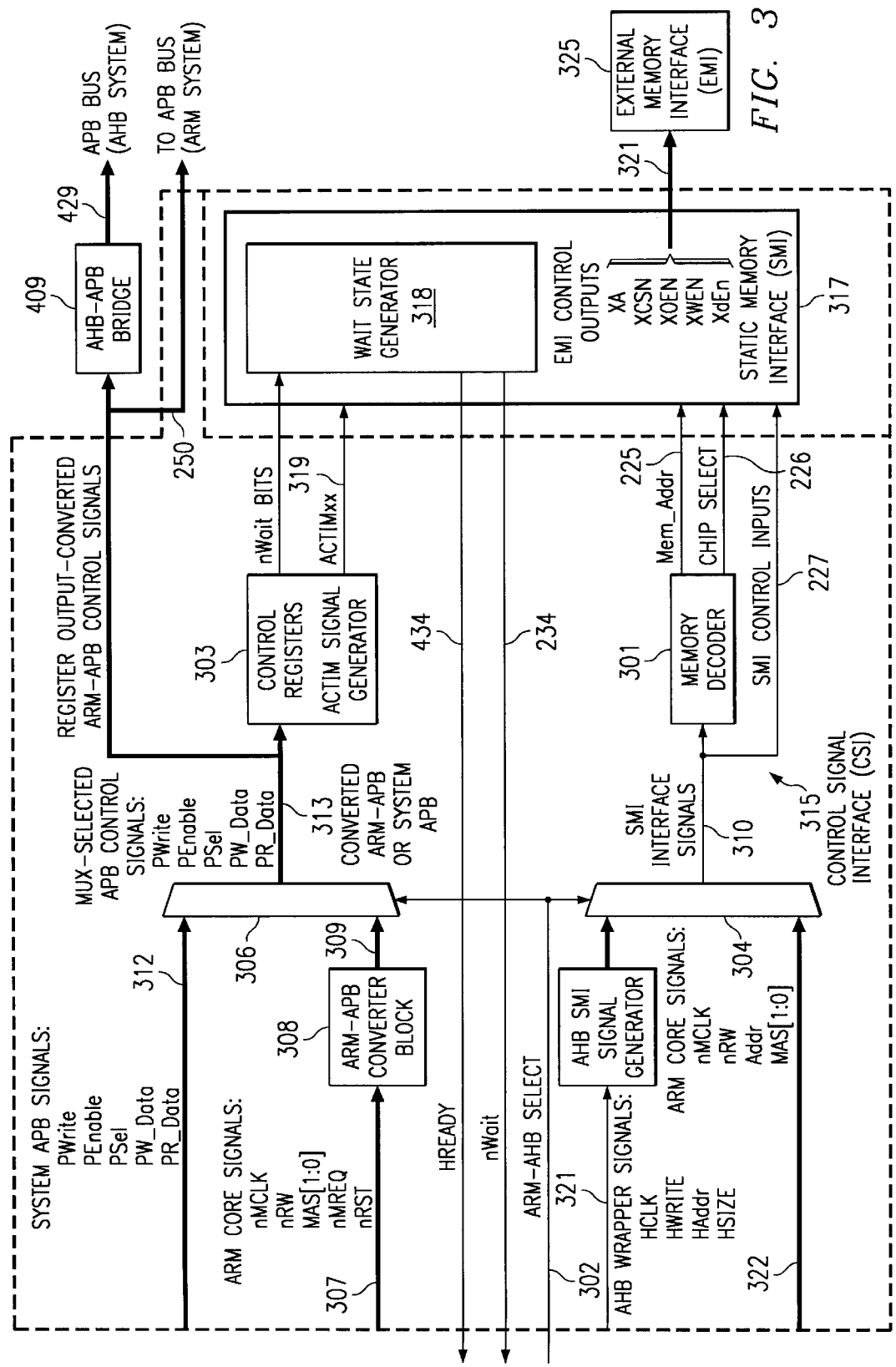
FIG. 3 illustrates the block diagram of the configurable external memory controller of this invention showing the main functional blocks of the controller and inter-connecting signals.

FIG. 3 illustrates additional detail of the two major functional blocks making up the configurable memory controller of this invention. Static memory interface 317 includes wait state generator block 318. The programmable control registers within wait state generator block 318 may be loaded through the application of specific configuration data patterns passed to the controller in a pre-programming step. Some of the features which may be programmed are:

1. Activate one or more of the following: SRAM, ROM, FLASH Memory.
2. Word/Half-Word/Byte Access.
3. Byte Swapping
4. Programmable AC Timing and Data Bus Width for External Memory.

5. Wait Cycles.

6. External Memory Address Width.

Control signal interface (CSI) 315 of the configurable memory controller contains a memory decoder 301 that takes in either ARM core signals or AHB wrapper signals through multiplexer 304 depending on the state of the ARM-AHB select signal 302. Memory decoder 301 outputs memory address bits (Mem_Addr) 225 and a chip select signal 226. At the output of the static memory interface 317, external output enable (XOEN) 214, external write enable (XWEN) 215 and external tri-state enable (XdEn) 213 drive the external memory interface 325.

Static memory interface 317 also provides an nWait signal 234 from wait state generator 318. This signal is also passed back to ARM core 201 (FIG. 2). The configurable memory controller is programmable for the 'number of wait states' the system uses. Wait state generator 318 sends nWait signal 234 from a configuration register that the user programs for the number of waits the external memory requires.

When memory request signal (nMREQ) 241 is low and nWait signal 234 is low, depending on the value of the upper range address bits, an active output at either XCSN[0], XCSN[1], XCSN[2] or XCSN[3] is generated. If read/write signal (nRW) 232 is 'high', the controller will perform a write to memory; if read/write signal (nRW) 232 is 'low' it will perform a read from memory. That is, the required bit of the active 'low' write enable signal XWEN[3:0] 215 is set 'low' if writing to memory and 'high' if reading from memory. The active 'low' external output enable signal (XOEN) 214 is set 'low' if the controller is performing a read from memory and 'high' if the controller is performing a write to memory.

The external tri-state enable (XdEn) 213 is set in the same state as external output enable signal (XOEN) 214. If a read operation is active, the tri-state buffer is set to 'off', allowing the central processing unit to read the data bus. If the tri-state buffer is set to 'on', it will allow the write data bus to send data to memory. The data is broadcast to all memory banks and the active chip select determines which memory bank receives write data. If a program access is being made that requires wait-states as programmed in the control register, the controller will also hold nWait signal 234 'low', thereby not allowing another program access until the most recent access is finished as determined by a count-down counter inside the wait-state block. This counter counts the number of clock cycles received from the core.

Since the configurable memory controller is programmable, it receives an reset signal (nMRST) 242 from ARM core and resets the control registers to their maximum number of wait states during a system reset. Note that although FIG. 3 does not show it explicitly, the address (Addr) 233 from the ARM central processing unit core or host address (HAddr) 433 (see FIG. 4) from the AHB wrapper is broadcast throughout the entire system.

Figure 4:
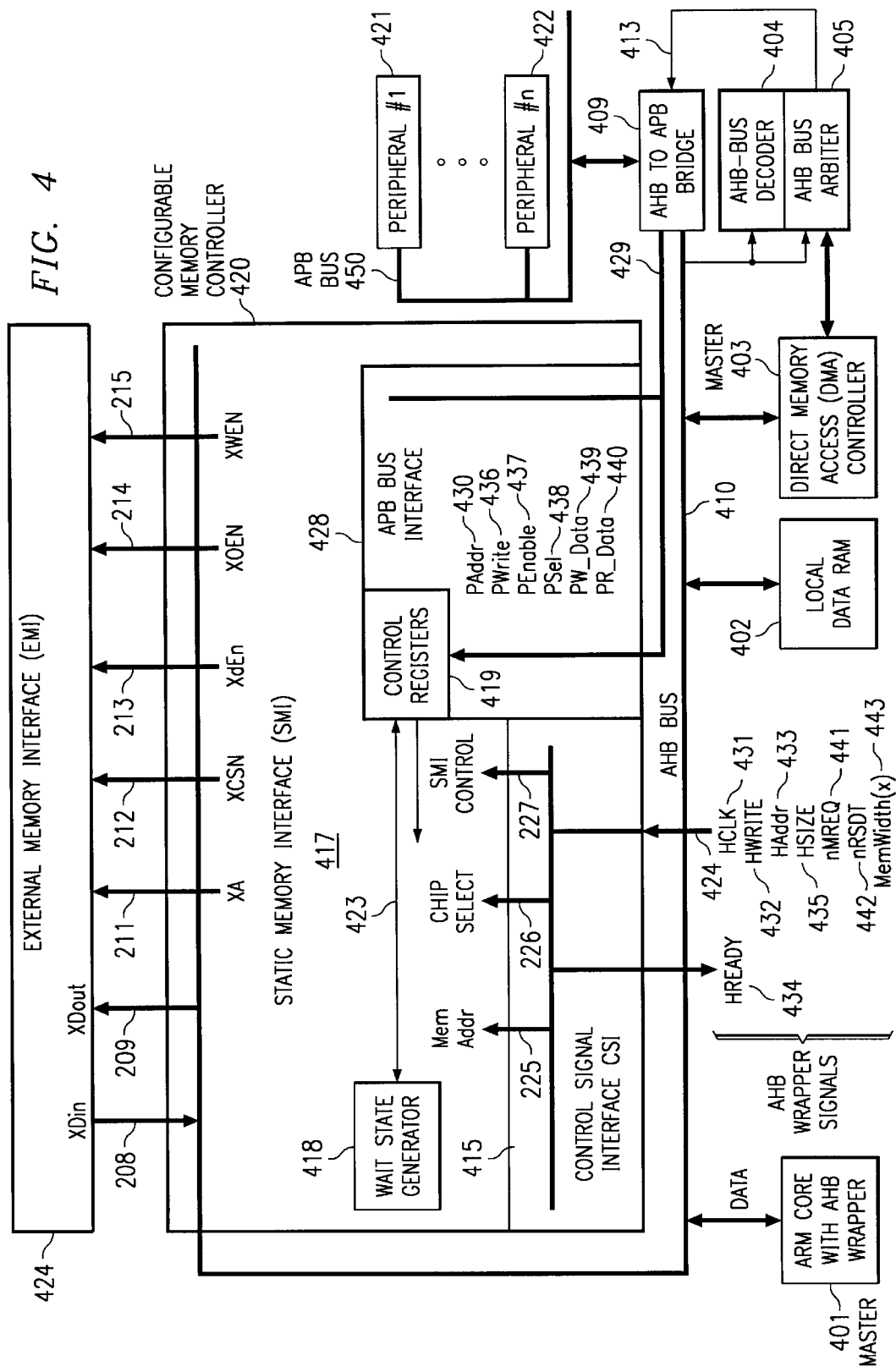
FIG. 4 illustrates the block diagram of an AHB system with two or more AHB bus master devices, central processing unit, direct memory access, and other possible masters, and the configurable memory controller of this invention connected to the AHB bus and operating from AHB wrapper generated control signals.

Consider for a moment an AHB system as illustrated in FIG. 4. If the central processing unit is making a system access and not a program access, the upper address bits do not trigger the memory decoder 301 of FIG. 3. Instead, the address will be passed through AHB system and be sent in turn to AHB decoder 404 and arbiter 405, which will then activate an AHB transfer. During a program access, even though the address is broadcast to the AHB bus, no action will take place since the core is accessing the program memory space. The AHB upper address bits that are sent to the AHB controller will not activate any chip select on the AHB bus. The configurable memory controller will perform any byte swapping/fetching required. This requires the HSIZE[1:0] signals 435 from the ARM core to determine access size. If the access is for byte-sized memories (8-bit data bus), the memory controller will make four accesses to the memory to create a 32-bit word. If the access is for 16-bit code the memory controller will make just two accesses to the memory to create a 32-bit word. The memory width is set via external pins MemWidth(x) [1:0] (2-bit pair signals) 443 for the boot memory (CS0). This memory width can be programmed in a control register for the other memories. If half-word sized memories are being used as determined by the MemWidth(x) signals 443 for CS0 and control registers for CS1-3, two accesses are required for a 32-bit instruction and only one access for a 16-bit instruction. If full 32-bit data memory is being used, only one access is required for both 32-bit and 16-bit instructions. The ARM core with AHB Wrapper 401 will also receive the HWRITE signal 434 from the wait-state generator block 418 in order to determine how long to keep the signals active.

Configuration in the memory controller is accomplished by way of signal switching of five primary signals which differ in the two memory controller modes (ARM and AHB). In FIG. 3 this switching feature is represented by the ARM/AHB interface multiplexer 304. The AHB signals replacing corresponding ARM signals are also listed in Table 1 and are noted in FIG. 3 in four of the five listed signal paths. Switching between nWait signal 234 and HREADY signal 434 is carried out in wait state generator 318. Multiplexer 304 switches between nMCLK/HCLK, nRW/HWRITE, Addr/HAddr and MAS[1:0]/HSIZE[2:0]

The ACTIM signals 319 are the output of the control register/ACTIM signal generator block 303 to the EMI hardware. These signals control the timing of the wait state generator and the EMI Control output signals 321 to external memory.

TABLE 1

| ARM Signal | AHB Signal | Function | Difference |
|---|---|---|---|
| nMCLK | HCLK | System Clock | HCLK active 'low' nMCLK active 'low' |
| nRW | HWRITE | Read/Write | None |
| PAddr | HAddr | Address | HAddr is pipelined |
| nWait | HREADY | Wait State | Wait is set to the whole AHB system, not just ARM Core |
| MAS[1:0] | HSIZE[2:0] | Transfer Size | MAS 32 bits only; HSIZE 8/16/32 bits to 1024 bits. |

Table 2 gives further descriptive information of the total complement of interconnect signals interconnecting the several memory controller sub-blocks.

TABLE 2

| Signal Name | Signal Description |
|---|---|
| PClk | APB Clock |
| PSel | APB Chip Select |
| PAddr[6:23] | APB Address Bus |
| PWrite | APB nRead/Write signal |
| PEnable | APB Access Strobe |
| MemWidth (x) [1:0] | Data Bus Width for Bank X Memory |
| P R Data | APB Output Data Bus |
| P W Data | APB Input Data Bus |
| ACTIM (X) [15:0] | Read/Write AC Timing Control for Bank X Memory |

TABLE 2-continued

| Signal Name | Signal Description |
| --- | --- |
| MEMWIDTH REG[15:0] | Data Bus Width Set for each Bank's Memory and FF Wait (Fast Frequency Wait Cycle) |
| nMCLK | Invert M Clock |
| nMREQ | Memory Request |
| nWait: | Wait Signal |
| MAS[1:0] | Memory Access Size |
| Dout[31:0] | Input Write Data Bus |
| Din[31:0] | Output Data Bus |
| XA[EMI AD+1:0] | External Address Bus |
| XCSN[3:0]: | External Chip Select |
| XOEN: | External Output Enable |
| XWEN[3:0]: | External Write Enable |
| XDout[31:0]: | External Output Data Bus |
| XDin[31:0]: | External Input Data Bus |

The multiplexer 306 of FIG. 3 selects the required APB bus signals for the ARM or the AHB case depending on the state of the ARM-AHB select signal 302. The raw ARM core signals 307 are converted to APB bus compatible signals in ARM-APB converter block 308. In the AHB mode, the multiplexer 306 simply passes the system APB bus signals 312 to the output node 313.

FIG. 4 illustrates the configurable memory controller 420 of the invention connected in an AHB bus system. The ARM core with AHB wrapper 401 is one master and the direct memory access controller 403 is a second bus master. Memory request signal (nMREQ) 441 initiates a memory request from the location given by host address (HAddr) 433. The memory request is passed via the control signal interface 415 to the static memory interface (SMI) 417 through signal paths memory address (Mem Addr) 225, chip select 226 and SMI control 227. If the request involves a write or read involving the central processing unit and any block of external memory then the configurable memory controller 420 processes the request. The configurable memory controller operates on the external memory interface (EMI) 425 using only AHB wrapper signals. This mode of operation allows the central processing unit to perform local RAM access on the AHB bus 410 simultaneously and no processor cycles are lost.

Transactions passing data from external memory to local data RAM 402 require the configurable memory controller to operate from AHB wrapper signals. Transactions involving writes to or reads from peripheral devices 421 or 422 must be arbitrated through AHB bus decoder 404 and AHB bus arriber 405. Successful arbitration and access by the peripheral bus to the AHB bus is enabled via signals 413 from the AHB arbiter 405 to the AHB-to-APB bridge 409.

On the external memory side, control from static memory interface (SMI) 417 passes to the external memory through signal paths external chip select (XCSN) 212, external tri-state enable (XdEn) 213, external output enable (XOEN) 214 and external output enable (XOEN) 215. Input data passes from external memory to static memory interface (SMI) 417 via data in (XDin) 208. Output data passes from to static memory interface (SMI) 417 to the external memory passes via external data output (Xdout) 209. Addressing for external memory passes through external address bus (XA) 211. The configurable memory controller operates in FIG. 4 as an AHB system controller. When the user instantiates the module at design time, he can connect either the ARM signals described in FIG. 2 or the AHB wrapper signals of FIG. 4. The unused group of signals is tied off. Thus the configurable memory controller contains all the logic to do an ARM system memory controller. For the system with an AHB bus the AHB decoder 404 is used. The AHB bus bridge takes care of the pipelining, so the configurable memory controller does not have to provide any special additional functionality. The AHB bus arbiter 405 determines which master has control of the bus. Chip select information is generated in the control signal interface (CSI) 415, passed from the memory decoder to the static memory interface (SMI) 417, which turns it into XCSN[0], XCSN[1], XCSN[2], or XCSN[3].

The configurable memory controller is programmable for wait states, requiring no altered operation in that respect. The configurable memory controller generates a new signal, HREADY 434, as part of the AHB protocol. During a wait-state, HREADY is set 'low', telling the AHB system that the memory controller is not finished yet. This operation replaces the use of nWait as an output back to the ARM core. Inside the control signal interface (CSI) 415 of the configurable memory controller, multiplexing (see multiplexer 304 of FIG. 3) allows selection of either the ARM core signals or AHB core signals. The ARM-AHB select signal 302 is set either 'high' for ARM mode or 'low' for AHB mode. The multiplexer output provides for either ARM or AHB wrapper SMI interface signals 310. The ARM-AHB select signal 302 is also used as an enabling signal for any timing changes that are needed.

What is claimed is:

1. A memory controller device selectively operating from either a first set of input control signals or a second set of input control signals, said memory controller comprising:
    a first set of inputs receiving said first set of input control signals;
    a second set of inputs receiving said second set of input control signals;
    an external memory interface operative for connection to an external memory including an address bus and a data bus;
    a signal converter device connected to said first set of inputs for converting signals in said first set of control signals to said second set of control signals;
    a mode input indicating selection of a first bus mode or a second bus mode; and
    a multiplexer having a first input connected to receive said converted signals from said signal converter device, a second input connected to said second set of inputs, a control input connected to said mode input and an output supplying said external memory controller, said multiplexer selecting for output either said first input or said second input dependent upon said bus mode indicated by said mode input.

2. The memory controller device of claim 1 further comprising:
    a memory decoder receiving memory address from said multiplexer and decoding address location data to generate and external memory address and a chip select signal dependent upon said address location data.

3. The memory controller device of claim 1 further comprising:
    a memory interface programmable wait state generator device forming first wait state values when said mode input indicates said first bus mode and second wait state values when said mode input indicates said second bus mode.

4. The memory controlled device of claim 1, wherein:
    said bus mode indicated by said mode input is fixed upon manufacture of said memory controller.

5. The memory controller device of claim 1, wherein:

said first set of input control signals consists of native microprocessor control signals; and said second set of input control signals consists of signals derived from a wrapper device encasing said native microprocessor, said second set of input control signals permitting plural bus master devices and control arbitration.

6. The memory controller device of claim 1, wherein:

said memory controller device has a data transfer size select option with a variable data transfer size if said mode input indicates said first bus mode and a fixed data transfer size if said mode input indicates said second bus mode.

7. The memory controller device of claim 1, further comprising:

a third set of inputs receiving a third set of input control signals;

a third set of input control signals from a third bus, said third set of input control signals optionally converted to third bus protocol as to form and timing or passing unaltered to said external memory interface.

8. The memory controller device of claim 7, further comprising:

a bus bridge between said second bus and said third bus, said bus bridge controlled by memory controller as master.

* * * * *